April 28, 1964  G. MONNET  3,130,523
APPARATUS AND METHOD FOR COUNTERBALANCING OF ROTATING BODIES
Filed May 3, 1960  2 Sheets-Sheet 2
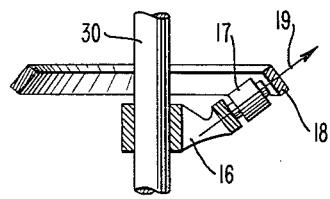
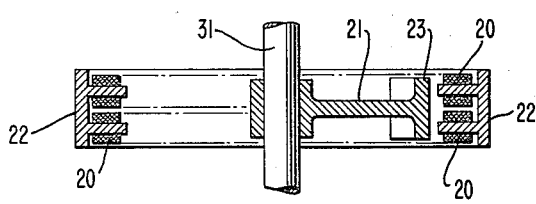
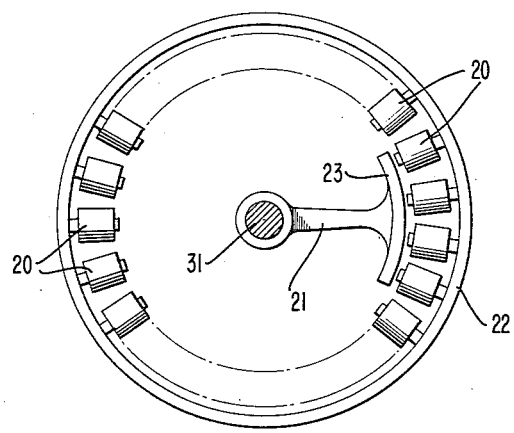
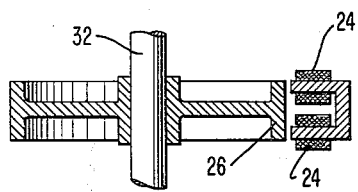
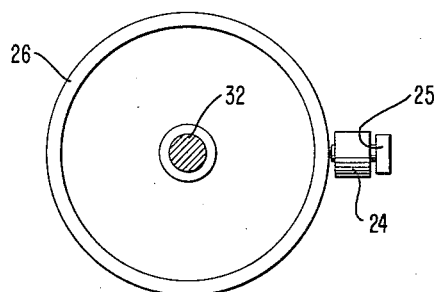
INVENTOR.
GEORGES MONNET
BY Bauer and Seymour
ATTORNEYS

# United States Patent Office 3,130,523
Patented Apr. 28, 1964

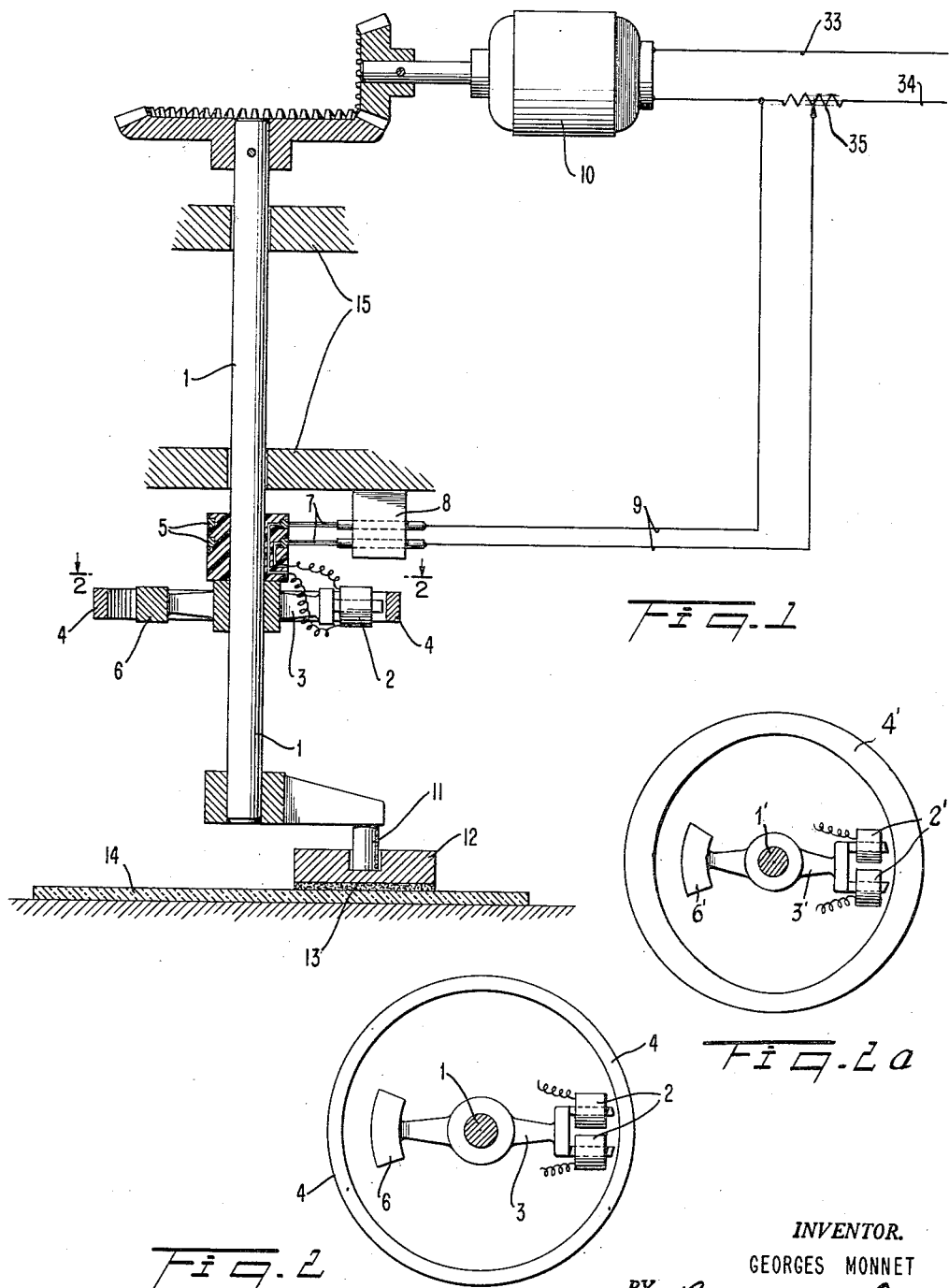

3,130,523
APPARATUS AND METHOD FOR COUNTER-
BALANCING OF ROTATING BODIES
Georges Monnet, Isere, France, assignor to Compagnie
de St.-Gobain, Neuilly-sur-Seine, France
Filed May 3, 1960, Ser. No. 26,479
Claims priority, application France May 6, 1959
18 Claims. (Cl. 51—119)

This invention relates to an apparatus for and a method of subjecting a rotating body to an adjustable force intersecting the axis of rotation of the body. The invention may be used, for example, in the counterbalancing of rotating bodies. Although the invention is particularly described in one embodiment thereof in connection with the counterbalancing of rotating bodies in glass grinding and polishing apparatus, it may also be employed to advantage in the application of desired forces to rotating bodies in general, as well as for the counterbalancing of rotating bodies in general, particularly where the forces tending to disturb the dynamic equilibrium of a body cannot be predetermined either as to their values or as to the time at which they will take place during the rotation of the body.

When a body rotating about a fixed axis is subjected to unbalancing forces that impair its dynamic equilibrium around the axis, it is the usual practice to provide the body with "inertia blocks." Inertia blocks are heavy elements attached to the body and located at some distance from its axis of rotation, such elements generating centrifugal forces which are of such value and angular location as to counterbalance the unbalancing forces upon the body. Since the centrifugal forces generated by such inertia blocks are located in planes at right angles or normal to the axis of rotation of the body, the corrective centrifugal forces, in counterbalancing the disturbances, can cancel out only the components of the unbalancing forces which lie in such planes. The axial components of the unbalancing forces thus continue to exist.

When the components of the disturbing force or forces in planes normal to the axis of rotation to the body are constant, the inertia blocks and their location relative to the body capable of counterbalancing such components are also constant. This is the simplest and most frequently encountered situation occurring in practice. If, however, the components of the unbalancing force or forces lying in planes normal to the axis of rotation of the body are variable, the exact counterbalancing of the body requires that the inertia blocks themselves be variable as to mass, distance from the axis of rotation, and angular position in the normal plane. If, under such conditions of variable disturbing forces, the inertia blocks are of constant mass and are fixedly positioned relative to the axis of rotation of the body, the counterbalancing of the body is imperfect. If the inertia blocks were made variable as to mass and/or spacing from the axis of rotation of the body, the resulting structure would be very complicated.

The apparatus and method of the present invention overcomes the above outlined difficulties and makes it possible to exert on a body rotating around a fixed axis a force which intersects the axis of rotation and that has an arbitrary, either constant or variable direction, and that has a value which is adjustable as required with respect to a standard or reference value established in advance. The invention makes possible the application of such forces to the body without requiring any contact with the body itself. In accordance with the invention, the body is subjected to such forces, which in the case of counterbalancing are corrective counterbalancing forces, by subjecting it to electro-magnetic effects which may be controlled as desired as by varying the intensity of the electric current feeding the electro-magnets employed to produce the electro-magnetic effects.

In illustrative embodiments of the invention, the electromotive force or forces applied by the force-generating electro-magnets are controlled in intensity and also in direction with respect to the rotating body, so that the resulting magnetic forces counterbalance the disturbing force or forces that impair the equilibrium of the body in rotation. The devices of the invention may be described by the term "electro-magnetic inertia blocks" to suggest the similarity of effect with conventional inertia blocks, mentioned above. Such conventional blocks, however, have only a limited action, since they can produce only balancing forces perpendicular to the axis. With the present invention the "electro-magnetic inertia blocks" cannot only produce balancing forces perpendicular to the axis of rotation, but, by suitable design, can also be made to produce balancing forces having substantial components extending along or parallel to the axis of rotation of the body. It is possible to give to the balancing forces an arbitrary direction fixed or variable and an intensity regulated according to a predetermined law.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a somewhat schematic view in vertical axial section through a polisher used for the polishing of a sheet or plate of glass, such polisher being provided with a first illustrative embodiment of counterbalancing mechanism in accordance with the invention, certain of the parts being shown in elevation;

FIG. 2 is a view in horizontal section through the apparatus of FIG. 1, the section being taken along the line 2—2 of FIG. 1;

FIG. 2a is a view similar to FIG. 2 of a second embodiment of apparatus in accordance with the invention;

FIG. 3 is a somewhat schematic fragmentary view in vertical third of a second embodiment of apparatus in accordance with the invention, such apparatus producing upon a rotating body forces which have substantial components both perpendicular and parallel to the axis of rotation, certain of the elements being shown in elevation;

FIG. 4 is a schematic fragmentary view in vertical section of a fourth embodiment of apparatus in accordance with the invention, certain of the parts being shown in elevation;

FIG. 5 is a view in plan of the apparatus of FIG. 4;

FIG. 6 is a fragmentary somewhat schematic view in vertical section through a fifth embodiment of apparatus made in accordance with the invention, certain of the parts being shown in elevation; and FIG. 7 is a view in plan of the apparatus of FIG. 6.

The apparatus of the invention, as above indicated, may be used to advantage with a great variety of rotating bodies. The apparatus is particularly advantageous in the counterbalancing of rotating mechanism which is subjected to variable disturbing forces. Typical of such mechanisms is that shown in FIGS. 1 and 2 for grinding or polishing a plate or sheet of glass.

The apparatus shown in FIGS. 1 and 2 is one which is employed in the polishing of glass plates. As there shown, such apparatus includes a vertical shaft 1 driven by a motor 10 through the medium of gearing and bearing a crank 11. At the end of the crank arm on shaft 1 a pin drives a polishing tool 12, tool 12 being provided with felts 13 which are coated with a suitable polishing medium such as colcothar, the felts rubbing a glass plate 14 under pressure in order to polish it.

The frictional force between felts 13 and plate 14 is transmitted to the shaft 1. Such frictional force rotates in synchronism with the crank shaft 11, and in a transverse plane perpendicular to shaft 1, it is located perpendicularly to crank 11. Because such frictional force produces reactions on the pillow blocks 15 in which shaft 1 is journalled, counterbalancing of the apparatus would be advantageous. If such frictional force were constant, a simple inertia block would serve to counterbalance it. The frictional force, however, is not constant because it is proportional to the friction coefficient between the felt 13 and the plate 14. Such friction coefficient may vary for many reasons, among them being variations in abrasive supply and the stage which the polishing has reached, and so counterbalancing by means of a simple inertia block connected to shaft 1 is inadequate.

An electro-magnetic inertia block made in accordance with the present invention, however, provides a simple solution. In FIGS. 1 and 2 a first embodiment of such inertia block is shown mounted on the polishing apparatus. As there shown, mounted below the lower pillow block 15 and between it and the crank arm driving the polishing tool 12 there is an arm 3 fixedly keyed to shaft 1. The arm 3 carries two electro-magnets 2 on its outer end.

The electro-magnetic inertia block is made up not only of the arm 3, and the magnets 2 disposed on the former, but a ferro-magnetic ring 4 fixedly positioned coaxial of shaft 1 so as closely to confront the outer ends or pole pieces of coils 2. The spacing between ring 4 and the poles of coils 2 is such that when the coils are energized substantial attractive force is developed between the poles of the coils and ring 4. Coils 2 are shown as being connected in series and as having the leads thereto connected to slip rings 5 mounted in an electrically insulating sleeve affixed to shaft 1. Two brushes 7, mounted in a fixed insulating support 8, constantly make contact with the slip rings. Lead wires 9 are connected to brushes 7, and are so energized that the attractive force between coils 2 and ring 4 varies instantaneously as required to counterbalance the frictional force between felts 13 and plate 14. In the embodiment shown, the current which energizes coils 2 is controlled so that it bears a predetermined relationship to the amount of power consumed by motor 10, such power, in turn, having a predetermined relationship to the frictional coefficient between felts 13 and plate 14. In FIG. 1 motor 10 is shown supplied with current through wires 33 and 34. Interposed in wire 34 is a resistance forming a part of a potentiometer 35 through which wires 9 are energized.

It will be apparent that the current flow through the resistance, and thus the voltage drop thereacross, are directly proportional to the amount of power consumed by motor 10 and thus to the frictional coefficient between felts 13 and plate 14. The voltage across wires 9, and thus the total power with which coils 2 are fed, is instantaneously proportional to such frictional force. Thus the coils 2 are energized at any instant with sufficient force effectively to counterbalance the frictional force and thus to maintain the rotating system in dynamic balance.

During the rotation of the shaft 1, the electro-magnet rotates passing before the electro-magnetic ring 4 without touching this ring. When the electro-magnet is energized it is attracted by the ring and exerts on the shaft a radial force at right angles to the axis, proportional to the intensity of the energizing current and rotating with the shaft. By variation of the intensity of the current, it would be possible to cause the radial force to follow a predetermined law.

It is possible to obtain a periodic variation on a single rotation of the shaft without modifying the energizing current, but in varying the space between electro-magnet and ring; in this case, the inside outline would not be circular and may differ from the circular form to impose to the form the desired variation. The apparatus of FIG. 2a illustrates one embodiment of apparatus incorporating such modification. Such apparatus is the same as that of FIG. 2 except that the ring 4' has an elliptical inner surface and has the parts thereof designated by the same reference characters as in FIG. 2 but with added primes. The apparatus of FIG. 2a produces two cycles of variation of the radial force between the electro-magnet 2' and the ring 4' in each single rotation of shaft 1'.

The attractive forces exercised on the body in rotation in the apparatus of FIGS. 1 and 2 being completely fixed by the energizing current of the electro-magnetics, it is possible to realize an automatic balancing whenever it is possible to establish a relation between the intensity of said current and the intensity of the disturbing forces.

It will be understood that although arm 3 and crank 11 are, for simplicity of illustration, shown parallel, arm 3 will, for any particular system be oriented relative to the arm of crank 11 so as to put the rotating system in dynamic balance and to permit the described application of corrective counterbalancing forces by the electromagnetic system when the felts 13 contact the glass and the apparatus is engaged in a polishing operation.

In the case when, in the absence of energizing current, the force exercised on the axis is to be zero, the mass of the electro-magnet and of its arm would be equilibrated by an ordinary block 6 carried by an arm placed oppositively to arm 3, as indicated in FIG. 2.

In FIGS. 3–7, inclusive, there are shown three additional embodiments of apparatus in accordance with the invention. The apparatus of FIG. 3 is adapted to exert upon the rotating system selectively controlled forces which have substantial components both in planes at right angles to the axis of rotation of the system and parallel to such axis. The further embodiments of FIGS. 4 and 5 on the one hand, and FIGS. 6 and 7 on the other, produce selectively controlled forces lying at right angles to the axis of rotation of the system. The embodiment of FIGS. 4 and 5 may be substituted, if desired, for the counterbalancing apparatus employed in the polishing system of FIGS. 1 and 2.

In FIG. 3 there is shown a portion of a shaft 30 which is rotatable about its longitudinal axis. It will be assumed that it is desired to apply to such shaft, at selected times, with a desired variable intensity, a force which has a substantial component not only in a plane lying transverse to the axis of rotation of the shaft but also a component lying along such axis. To accomplish such result, there is employed an arm 16 affixed to rotating shaft 30, the arm in its outer portion being upwardly inclined at a marked angle. The outer end of arm 16 carries one or more coils 17, each coil having a pole at its outer end. Closely confronting such poles is an annular ferro-magnetic ring 18 which is fixedly mounted coaxial of shaft 30 on a support, not shown. Ring 18 is of frusto-conical shape, having its two broad faces parallel and lying perpendicular to the longitudinal axes 19 of the coils 17. The coils 17 may be energized through the medium of slip rings and brushes (not shown) similar to those shown in FIG. 1. The current input through the coils may be varied either manually, as by a rheostat interposed between the coils and the source of current supply, or it may, in some applications, be energized automatically in generally the same manner as shown in FIGS. 1 and 2, wherein the energization of the coils is proportional to the power consumed in rotating the system.

Upon the energization of the coils 17 in the cycle of rotation of shaft 30, there is produced an attractive force between the coils and annular member 18 along the direction of the axis 19 of the coils. Such attractive force has substantial components directed both horizontally and vertically in FIG. 3. It will be understood that the direction of the total attractive force, and the relative values of the horizontal and vertical components may be predetermined by the selection of a desired angle of the axis 19 of the coils relative to the horizontal.

In the embodiment of FIGS. 4 and 5, the magnetic field-generating coils 20 are fixedly mounted on an annular stator 22 which is coaxial of the rotatable shaft 31. Shaft 31 has a radially extending arm 21 affixed thereto, the arm having a laterally extended part-circular pole piece 23 mounted on its outer end. The coils 20 are connected, either serially or in parallel, so that they are all energized at the same time. Only those coils which confront pole piece 23 at each instant during the rotation of piece 23, have any substantial effect insofar as the application of a force upon the pole piece and thus upon the shaft 31 is concerned.

The apparatus of FIGS. 4 and 5 may, if desired, be employed in glass polishing apparatus such as that shown in FIGS. 1 and 2, in the place of the electro-magnetic counterbalancing device there shown. It will be understood that when the apparatus of FIGS. 4 and 5 is thus employed, the system will be provided with a suitable counterbalancing mass or masses so that the system is in dynamic balance when the felts 13 do not operatively engage the glass 14. In such construction the lead wires to the coils 20 will be connected to wires such as wires 9 of FIG. 1 and will thus receive current through a device such as potentiometer 35, or a variable transformer, which energizes the coils to a degree which is proportional to the power consumed by motor which drives shaft 31. As before, the coils 20 will be energized to varying degrees during the various parts of the cycle of rotation of the system, whereby to generate forces which are applied thereto so as effectively to counterbalance the instantaneous frictional forces between felts 13 and glass 14.

In the apparatus of FIGS. 6 and 7 a pulley-like rotor 26 is fixedly secured to a rotatable shaft 32. Confronting the rim of the rotor at one location is an electromagnetic coil 24 fixedly mounted upon a core 25. The apparatus of FIGS. 6 and 7 differs from that of FIGS. 1–5, inclusive, by reason of the fact that whereas in FIGS. 1–5, inclusive, the attractive force rotates with the body or shaft, in FIGS. 6 and 7 the attractive force has a direction which is fixed in space. Thus the force between coil 24 and rotor 26, when the latter is energized, always lies along the horizontal line extending through the axis of shaft 32 and coinciding with the longitudinal axis of coil 24.

The portion of the body intended to be attracted is made of ferro-magnetic metal.

The apparatus of FIGS. 6 and 7 may be employed in a variety of applications wherein it is desired to impose selected forces upon a rotating body at different portions of the cycle of rotation thereof. Among such applications is the counterbalancing of a rotatable body to counteract unpredictable and random unbalancing forces exerted thereupon. In such case, there may be employed a means which detects the size and instantaneous angular position of such disturbing force exerted upon the rotating body, and a means for example a thyratron responsive thereto for energizing coil 24 with such intensity as instantaneously to counterbalance or nullify such disturbing force.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art. Thus any of the electro-magnetic force-generating means of FIGS. 1, 2, and 4–7, inclusive, may be made, if necessary or desired, so that the force generated thereby has substantial components both in planes transverse to the axis of rotation and in directions along the axis of rotation, as in FIG. 3. Further, any of the elements which, due to rotation in a magnetic field, would have stray induction currents generated therein, may be laminated to avoid losses due to hysteresis.

In a general way, according to the invention, the problem, from an electrical stand-point, lies in the production of a flux passing simultaneously through a rotating body and through the outer stationary body, said two parts being in a ferro-magnetic metal; all the technics utilised in the electrical motors may be employed, because the problem is the same, the parts which are indicated as electro-magnets or attracted pieces may be motor inductors or armatures.

What is claimed is:

1. In combination, a body adapted to rotate about an axis, means for subjecting the body to a force which disturbs its dynamic balance, and electro-magnetic means adapted to exert on said body a force in a desired direction to counterbalance the force disturbing the dynamic balance of the body, said last-named means comprising elements rotatable relative to each other including a rotor affixed to the body, a stator closely confronting the rotor, coil means mounted to coact with the stator and rotor, the rotor, the stator and the coil means being constructed and arranged to produce an electro-magnetic force acting along a direction intersecting the axis of rotation of the rotating body, and means to energize said coil means whereby to produce an electro-magnetic force between the stator and rotor and thus to subject the body to a force intersecting the axis of rotation of the body at a predetermined angle, one of the elements consisting of the stator and rotor being unsymmetrical with respect to the axis of rotation and extending through only a part of the circumference around the axis of rotation of the body, and the other, cooperating element of the electro-magnetic means extending along the entire periphery of a circumference around the axis of rotation of the body.

2. The combination claimed in claim 1, wherein the coil means is mounted on one of said elements.

3. The combination claimed in claim 1, wherein the stator and rotor are so constructed and arranged that the electro-magnetic force rotates with the body.

4. The combination claimed in claim 1, wherein the stator and rotor are so constructed and arranged that the direction of the electro-magnetic force remains stationary in space as the body rotates.

5. The combination claimed in claim 1, wherein the coil means is mounted on the rotor and has at least one pole, and the stator comprises an annular ferro-magnetic element coaxial of the axis of rotation of the body and closely confronting the pole as it rotates.

6. The combination claimed in claim 1, wherein the coil means has at least one pole and is mounted on the stator, and the rotor is in the form of a solid of revolution and having a pole with a circular rim coaxial of the axis of rotation of the body and closely confronting the pole as it rotates thereby.

7. The combination claimed in claim 1, wherein the rotor and stator are made of ferro-magnetic metal.

8. The combination claimed in claim 1, wherein the electro-magnetic forces are created by electro-magnets producing an electro-magnetic flux passing simultaneously through a rotating mass connected to the rotating body and a fixed outer ring, both parts being ferro-magnetic metal.

9. In the combination which comprises a body adapted to rotate about an axis, a prime mover to drive the body, means for subjecting the body during its rotation to a random variable force which tends to disturb its dynamic balance, the instantaneous power output of the prime mover being a measure of such disturbing force, the improvement which comprises electro-magnetic means adapted to exert on said body a corrective force counterbalancing the disturbing force, said last named means comprising elements rotatable relative to each other, including a rotor affixed to the body, a stator closely confronting the rotor, coil means mounted to coact with the stator and rotor, means to energize said coil means to produce an attractive force between the stator and rotor thus to subject the body to a corrective force intersecting the axis of rotation of the body at a predetermined angle, and means to vary the degree of energization of the coil means and thus the attractive force proportionally and in timed relation to variations in the power delivered by the prime mover, one of the elements consisting of the stator and rotor extending through only a part of the circumference around the axis of rotation of the body, and the other, cooperating element of the electro-magnetic means extending along the entire periphery of a circumference around the axis of rotation of the body.

10. The combination claimed in claim 9, wherein the prime mover is an electric motor, the power input to the electric motor is a measure of the power output of the motor, and the means to vary the energization of the coil means detects variations in the instantaneous amount of electric power delivered to the motor and varies the degree of energization of the coil means in response thereto.

11. Polishing apparatus comprising a system including a rotatable shaft, a crank on the shaft, a polishing tool mounted to be driven in an orbit by the crank, a motor for driving the shaft, the tool, crank, and shaft being subjected during their rotation to a variable frictional polishing force which tends to disturb the dynamic balance of the system, the instantaneous power input to the motor being a measure of such disturbing force, and electro-magnetic means adapted to exert on said system a corrective force counterbalancing the disturbing force, said last named means comprising elements rotatable relative to each other including a rotor affixed to the shaft, a stator closely confronting the rotor, coil means mounted to coact with the stator and rotor, means to energize said coil means to produce an attractive force between the stator and rotor thus to subject the body to a corrective force intersecting the axis of rotation of the body at a predetermined angle, and means to vary the degree of energization of the coil means and thus the attractive force proportionally and in timed relation to variations in the power consumed by the motor, one of the elements consisting of the stator and rotor extending through only a part of the circumference around the axis of rotation of the body, and the other, cooperating element of the electro-magnetic means extending along the entire periphery of a circumference around the axis of rotation of the body.

12. The process which comprises rotating a body on a fixed axis, subjecting the body to a force which disturbs its dynamic balance, said force intercepting the axis of rotation of the body at a predetermined angle, establishing a magnetic field exerting an electro-magnetic force on the body as the body rotates, along a direction intersecting the axis of rotation of the body at a predetermined angle and substantially opposite to that of the disturbing force, and varying the strength of the magnetic field to vary such electro-magnetic force so that the force exerted on the body by the magnetic field is of such value, is of such direction, and is so timed as to counterbalance said disturbing force.

13. The process as claimed in claim 12, wherein the magnetic field is produced by an electro-magnet, and the variation in the strength of the magnetic field is effected by varying the electric power fed to the electro-magnet.

14. The process as claimed in claim 13, wherein the electro-magnetic counterbalancing force rotates with the body.

15. The process as claimed in claim 13, wherein the electro-magnetic counterbalancing force is fixed as to its direction in space, and the body rotates relative thereto.

16. In combination, a body adapted to rotate about an axis, means for subjecting the body to a force which disturbs its dynamic balance, and electro-magnetic means adapted to exert on said body a force in a desired direction to counterbalance the force disturbing the dynamic balance of the body, said last-named means comprising elements rotatable relative to each other including a rotor affixed to the body, a stator closely confronting the rotor, coil means mounted to coact with the stator and rotor, and means to energize said coil means whereby to produce an electro-magnetic force between the stator and rotor and thus to subject the body to a force intersecting the axis of rotation of the body at a predetermined angle, one of the elements consisting of the stator and rotor extending through only a part of the circumference around the axis of rotation of the body, and the other, cooperating element of the electro-magnetic means extending along the entire periphery of a circumference around the axis of rotation of the body, the rotor and stator being so constructed and arranged that the electro-magnetic force therebetween has a substantial component in a plane extending normal to the axis of rotation of the body and a substantial component extending along such axis.

17. In combination, a body adapted to rotate about an axis, the body including a crank and an arm fixed with respect to each other and rotatable about a common axis, the arm and crank being so oriented relative to each other as to put the rotating body in dynamic balance, means for subjecting the body to a force which disturbs its dynamic balance, and electro-magnetic means adapted to exert on said body a force in a desired direction to counterbalance the force disturbing the dynamic balance of the body, said last-named means comprising elements rotatable relative to each other including a rotor affixed to the body, a stator closely confronting the rotor, coil means mounted to coact with the stator and rotor, and means to energize said coil means whereby to produce an electro-magnetic force between the stator and rotor and thus to subject the body to a force intersecting the axis of rotation of the body at a predetermined angle, one of the elements consisting of the stator and rotor extending through only a part of the circumference around the axis of rotation of the body, and the other, cooperating element of the electro-magnetic means extending along the entire periphery of a circumference around the axis of rotation of the body.

18. In combination, a body adapted to rotate about an axis, means for subjecting the body to a force which disturbs its dynamic balance, and electro-magnetic means adapted to exert on said body a force in a desired direction to counterbalance the force disturbing the dynamic balance of the body, said last-named means comprising elements rotatable relative to each other including a rotor affixed to the body, a stator closely confronting the rotor, coil means mounted to coact with the stator and rotor, and means to energize said coil means whereby to produce an electro-magnetic force between the stator and rotor and thus to subject the body to a force intersecting the axis of rotation of the body at a predetermined angle, one of the elements consisting of the stator and rotor extending through only a part of the circumference around the axis of rotation of the body, and the other, cooperating element of the electro-magnetic means extending along the entire periphery of a circumference around the axis of rotation of the body, the radial distance between the stator and rotor is different in at least one zone angularly about the stator and rotor from that of at least another zone spaced angularly therefrom, whereby a predetermined corrective force is obtained on the rotor with a constant energizing current for the coil.

References Cited in the file of this patent

UNITED STATES PATENTS

| | | |
|---|---|---|
| 1,605,589 | Hunt | Nov. 2, 1926 |
| 1,639,444 | Terry | Aug. 16, 1927 |
| 2,130,903 | Rudenberg | Sept. 20, 1938 |
| 2,367,668 | Champayne | Jan. 23, 1945 |
| 2,375,404 | Deane | May 8, 1945 |
| 2,552,132 | Anderson | May 8, 1951 |
| 2,754,685 | Lansky | July 17, 1956 |
| 2,813,430 | Lehde | Nov. 19, 1957 |
| 2,909,871 | Heymes | Oct. 27, 1959 |
| 2,915,919 | Mitchell et al. | Dec. 8, 1959 |

FOREIGN PATENTS

| | | |
|---|---|---|
| 583,728 | Germany | Sept. 8, 1933 |
| 762,092 | Germany | June 28, 1954 |